Nov. 9, 1926.                                                    1,606,234
W. JORDAN
AUTOMATIC LOADING AND DUMPING TRUCK
Filed Oct. 22, 1923        3 Sheets-Sheet 1

Inventor
William Jordan

Nov. 9, 1926.
W. JORDAN
1,606,234
AUTOMATIC LOADING AND DUMPING TRUCK
Filed Oct. 22, 1923    3 Sheets-Sheet 2

Inventor
William Jordan

Nov. 9, 1926.  
W. JORDAN  
1,606,234  
AUTOMATIC LOADING AND DUMPING TRUCK  
Filed Oct. 22, 1923  3 Sheets-Sheet 3

Inventor  
William Jordan

Patented Nov. 9, 1926.

1,606,234

UNITED STATES PATENT OFFICE.

WILLIAM JORDAN, OF NEW YORK, N. Y.

AUTOMATIC LOADING AND DUMPING TRUCK.

Application filed October 22, 1923. Serial No. 670,040.

This invention relates to improvements in vehicles and has for its object to provide a self-loading and unloading vehicle.

Another object of the invention is to provide in a truck, means for automatically loading the same.

A further object of the invention is to provide in combination with a truck an automatic loading device.

A still further object of the invention is to provide in combination with a truck, a self-dumping means.

A still further object of the invention is to provide in combination with an ordinary truck, an attachable, self-dumping body.

Still another object of the invention is to provide in combination with a truck, an automatic loading device therefor and a dumping body and means whereby the loading device operates said body.

With the above and such other objects in view as may hereinafter more fully appear, I have invented the device illustrated in the accompanying drawings in which.

Figure 1:
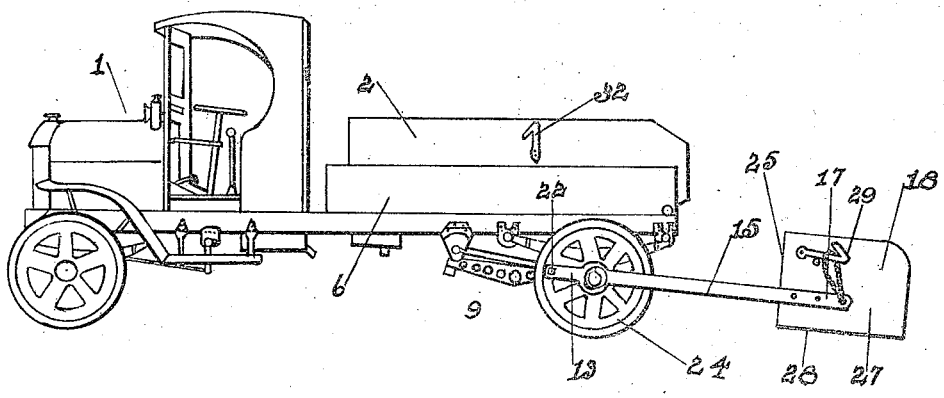
Figure 1 is a side elevational view of my device.
Figure 2:
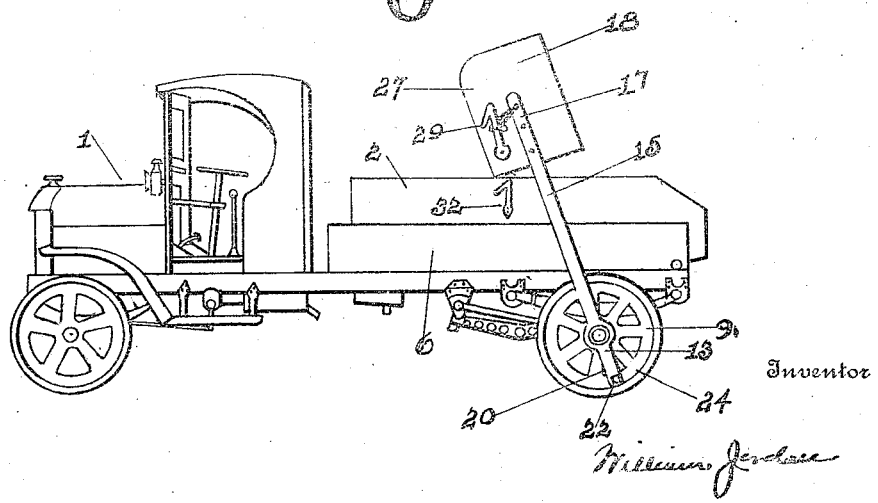
Figure 2 is a similar view shown in an adjusted position.

Like reference characters indicate like parts throughout the following specification and in the several views in the drawings in which 1 indicates a truck having a supplemental, detachable body 2, pivotally mounted upon the rod 3, having bearings in the side walls 4 and 5 of the body 6 of the truck 1. The rear end 7, of the supplemental body 2 projects slightly beyond the rear edge 7 of the body 6 whereby the body 2 may be pivotally raised upon said rod 3 in order to dump the load contained therein. The truck 1 is provided with rear wheels 8 and 9 upon the hub projections 10 and 11 of which are removably and pivotally mounted the ends 12 and 13 of the shaft members 14 and 15, the other ends 16 and 17 of which are fixedly secured to the loading scoop 18. The extreme ends 19 and 20 of the members 14 and 15 are secured by clamps 21 and 22 to the rim portions 23 and 24 of the wheels 8 and 9 so that upon the forward movement of the truck 1, the rotation of the wheels 8 and 9 will cause the scoop 18 to raise to dump its load into the body 2, as clearly indicated in Figure 2.

Figure 3:
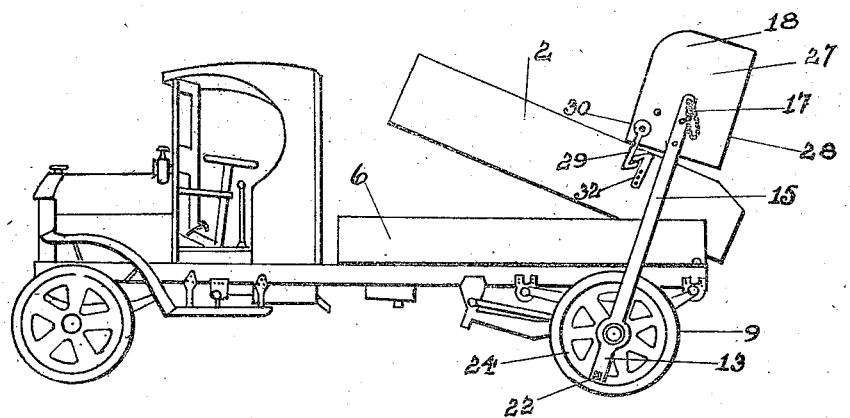
Figure 3 is a similar view shown in another adjusted position.
Figure 4:
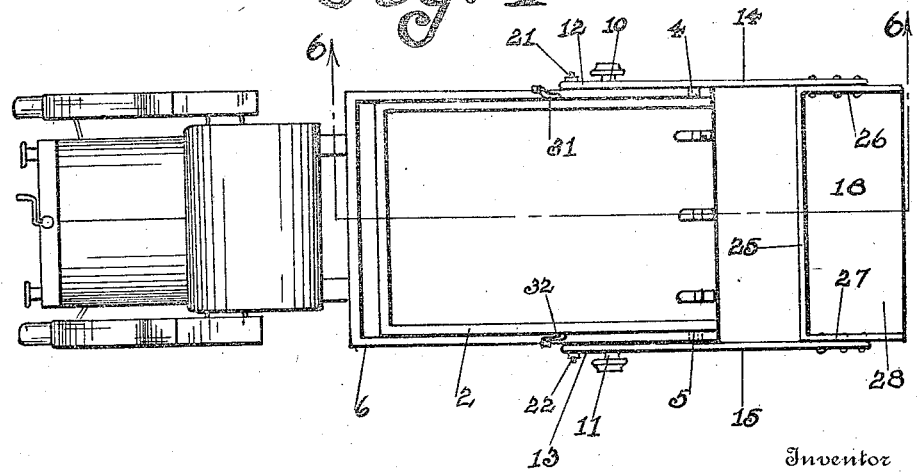
Figure 4 is a top plan view of the device.
Figure 5:
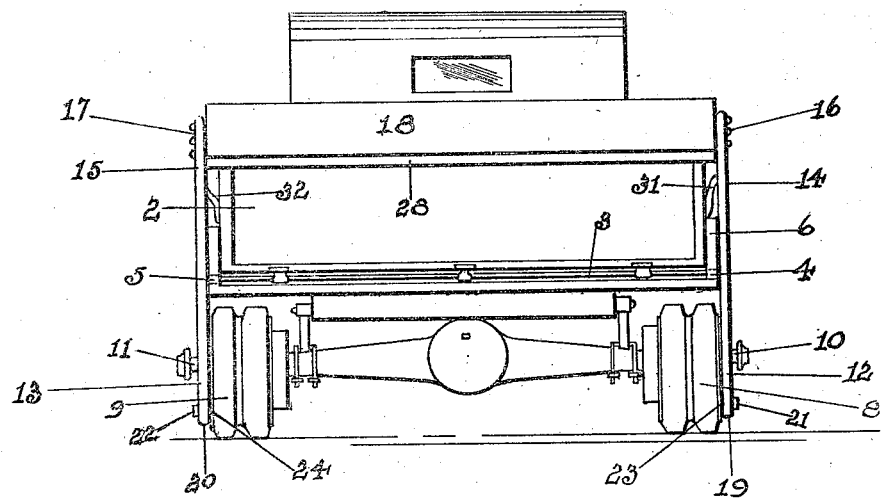
Figure 5 is a rear elevational view thereof.
Figure 6:
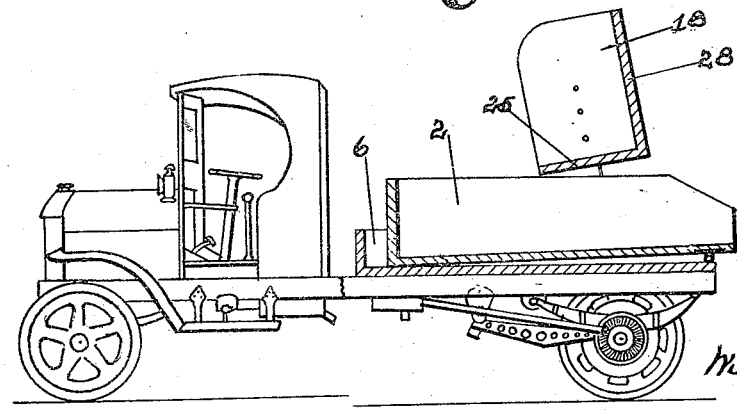
Figure 6 is a longitudinal, sectional view of Figure 4.

The scoop 18 consists of a forward wall 25, side walls 26 and 27 and a bottom wall 28, the rear of said scoop being open so that upon backing the truck 1, into a pile of snow, sand, gravel, coal or any other material to be loaded upon the truck, the bottom or scoop wall 28, will be forced under its load then, upon a slight forward movement of the truck, the scoop will be caused to raise thereover and dump its load into the body 2. Hooks 29 and 30 are provided on the rear upper edges of the walls 26 and 27 which, when the scoop is raised to its dumping position, automatically engage the hooks 31 and 32 in order that when the truck has reached its destination and the load is to be dumped, a slight rearward movement of the truck will cause the carrying down of the scoop 18 and with it the raising up of the body 2, whereby the same will dump its load, as clearly indicated in Figure 3. It will be noted here that the clamps 21 and 22 are released from the rim portions of the wheels after a slight forward movement of the truck has raised the scoop to its dumping position over the truck, whereby the truck may proceed without holding the wheels 8 and 9 against rotation. When the destination is reached said clamps are again secured to the wheel rim whereby the rearward motion of the truck will cause the scoop 18 to swing down to its lowermost position and with it raise the body 2 to its uppermost position, as indicated in Figure 3.

It will also be noted that the shaft members 14 and 15 are long enough to not only permit the scoop to ride over the side walls of the bodies 2 and 6, but permit sufficient space between the rear end of the body 2 and the forward wall of the scoop to permit the load to dump from said body. Immediately upon the forward movement, after the dumping operation, the scoop will be raised to its uppermost position whereby the scoop will be raised out of contact with the dumped load and prevent spreading of the same.

It is to be understood that my loading device, as above described, may be attached to any truck and may be used in combination with the dumping body or without the same.

Having described my invention, that which I claim to be new and desire to procure by Letters Patent is:

1. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, a truck body pivotally mounted upon said truck and operable by the arms.

2. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, a truck body pivotally mounted upon said truck, means for automatically connecting said scoop and said truck body upon forward motion of the rear wheels.

3. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, a truck body pivotally mounted upon said truck, means whereby said scoop will automatically dump said truck body upon movement of the scoop to engage the body.

4. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, a truck body pivotally mounted upon said truck, means whereby said scoop will automatically dump said truck body upon movement of the scoop to engage the body, said truck body and scoop having automatically operated couplings whereby said connection is made.

5. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, said truck having a body and a supplemental body pivotally mounted therein and operable by the arms.

6. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, said truck having a body and a supplemental body pivotally mounted therein, said second body projecting slightly beyond the rear end of said first body and operable by the arms.

7. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, said truck having a body and a supplemental body pivotally mounted therein and operable by the arms, said second body projecting slightly beyond the rear end of said first body, means for automatically dumping said supplemental body upon forward motion of the rear wheels.

8. In combination with a truck a scoop and means whereby the operation of the truck will cause the scoop to dump its load into the truck body, said truck having rear wheels, said means embracing a pair of arms fixedly connected to said scoop and detachably connected to the hub and rim portions of said wheels, means for fixing the free terminals of said arms to said wheel rims, said means being detachable, said truck having a body and a supplemental body pivotally mounted therein, said second body projecting slightly beyond the rear end of said first body, means for automatically dumping said supplemental body, said last means being controlled by said scoop.

9. In combination, a truck provided with rear wheels and a dumping body, a scoop operable by the movement of the wheels and adapted to operate the dumping body.

10. In combination, a scoop, a truck provided with a dumping body, arms straddling the rear wheels of the truck and dumping body and adapted to carry and lift the scoop and adapted also to lift the dumping body, the arms movable by the turning of the wheels.

In testimony whereof I affix my signature.

WILLIAM JORDAN.